United States Patent [19]
Williams

[11] Patent Number: 5,867,155
[45] Date of Patent: Feb. 2, 1999

[54] LARGE SCALE DISTRIBUTIVE VIDEO ON DEMAND SYSTEM FOR THE DISTRIBUTION OF REAL ESTATE PROPERTIES INFORMATION

[76] Inventor: Douglas Williams, 16236 San Dieguito Rd., Ste. 3-11, Rancho Santa Fe, Calif. 92067

[21] Appl. No.: 816,733

[22] Filed: Mar. 14, 1997

Related U.S. Application Data

[60] Provisional application No. 60/013,531 Mar. 18, 1996.

[51] Int. Cl.⁶ ........................................................ H04N 7/14
[52] U.S. Cl. ................................ 345/327; 348/7; 348/12; 395/200.48; 395/200.49; 455/4.2; 455/5.1
[58] Field of Search ..................................... 345/326, 327; 395/200.47–200.49; 348/6, 7, 10, 12, 13; 455/3.1, 4.1, 4.2, 5.1, 6.1, 6.2, 6.3

[56] References Cited

U.S. PATENT DOCUMENTS

| | | |
|---|---|---|
| 5,133,079 | 7/1992 | Ballantyne et al. ...................... 455/4.1 |
| 5,146,548 | 9/1992 | Bijnagte ................................... 395/117 |
| 5,235,680 | 8/1993 | Bijnagte ................................ 348/13 X |
| 5,247,347 | 9/1993 | Litteral ........................................ 348/7 |
| 5,325,297 | 6/1994 | Bird et al. ................................ 707/530 |
| 5,371,532 | 12/1994 | Gelman et al. ............................. 348/7 |
| 5,421,031 | 5/1995 | De Bey ..................................... 455/5.1 |
| 5,440,334 | 8/1995 | Walters et al. .............................. 348/6 |
| 5,442,390 | 8/1995 | Hooper et al. .............................. 348/7 |
| 5,479,202 | 12/1995 | Beriont ....................................... 348/7 |

*Primary Examiner*—Nathan Flynn
*Assistant Examiner*—John W. Miller
*Attorney, Agent, or Firm*—Patent Law & Ventore Group—Gene Scott

[57] ABSTRACT

A network system provides video information on demand concerning real estate properties, and in principle includes a large number of real estate information server locations as viewing sites. The servers are interconnected by a dedicated hard wire network so that video information may be shared. The video information is recorded, stored, transferred, and displayed using high speed digital data handling techniques. The video information is accompanied by digitized audio sound tracks.

9 Claims, 3 Drawing Sheets

LARGE SCALE DISTRIBUTIVE VIDEO ON DEMAND SYSTEM FOR THE DISTRIBUTION OF REAL ESTATE PROPERTIES INFORMATION

This application claims the filing date priority of Provisional application Ser. No. 60/013,531 filed on Mar. 18 1996 with the same title and inventor.

BACKGROUND OF THE INVENTION

1. Field of the Invention

This invention relates generally to methods for producing video presentations on demand, and more particularly to a method for making video programs available quickly and economically over a large geographic area.

2. Description of Prior Art

A primary objective in the real estate sales industry is to place high quality and appropriate real estate property information in the hands of buyers, quickly, inexpensively and locally. The so-called Multiple Listing Service (MLS) has been in use in the real estate sales industry for a number of years. The MLS publishes a printed magazine containing written descriptions and still photographs of real estate properties that are available for sale. The MLS also provides an on-line video presentation service the enables buyers to view still photographs of properties and to access details of these properties in written form on a video monitor. When a buyer appears in the marketplace he/she has the opportunity to consult the MLS as a preliminary step in making a match between the buyer's needs and those properties that are currently available for sale. The MLS system, although a great improvement over its predecessor systems has many faults and problems. Although the MLS fulfills the need for providing information relatively quickly, inexpensively and locally, it does not provide appropriate and high quality information. The buyer still must travel to the site of prospective properties in order to obtain an understating of the most important architectural factors accounting for most purchase decisions.

In the prior art describing high data rate distributive information systems, although nothing seems to exist in either common practice or in the literature relative to the real estate industry, the following references are of interest:

Ballantyne et al, U.S. Pat. No. 5,133,079, shows a new and useful method and apparatus for distribution of movies for viewing on a customer's television set. Digitized compressed signals containing audio and visual components of the movie selected by the customer are sent to the customer's receiver. The digital signals are converted to corresponding electronic signals; which are decompressed and converted to audio and video signals. These converted signals are passed to a conventional television set for viewing by the customer.

Litteral et al, U.S. Pat. No. 5,247,347, shows a public switched telephone network (PSTN) which provides a digital video signals from a video information provider to one or more of a plurality of subscriber premises. A subscriber uses either a standard telephone instrument over the PSTN or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse control channel form the subscriber to the central office for transmission on the ISDN packet data network back the video information provider. The interfaces also allow base band signaling and audio between the central office and the subscriber for conventional telephone instrument connectivity.

Gelman et al, U.S. Pat. No. 5,371,532, shows a store-and-forward architecture which stores and distributes information programs to subscribers on demand including: information warehouses which archive information programs from multiple service vendors and dispense information programs in segments to central offices in high speed bursts; central offices which manages subscriber's request for service and buffers segments of information programs for delivery to subscribers in real-time under the subscriber's interactive control; and customer premises equipment where a subscriber's requests and control signals for interactive play-out of information program are generated and information programs are received for the subscriber's use.

De Bey, U.S. Pat. No. 5,421,031, shows a system and method of optimizing transmission of a program to multiple users over a distribution system, with particular application to video-on-demand for a CATV network. The system includes, at a head end of the CATV network a scheduling and routing computer for dividing the video program stored in long term fast storage or short term fast storage into a plurality of program segments, and a subscriber distribution node for transmitting the program segments in a redundant sequence in accordance with a scheduling algorithm. At a receiver of the CATV network there is provided a buffer memory for storing the transmitted video program segments for subsequent playback whereby, in use, the scheduling algorithm can ensure that a user's receiver will receive al of the programs segments in a manner that will enable continuous playback in real time of the program. Under the control of controller the receiver distinguishes received program segments by a segment identifier so that redundant segments captured in capture memory are then stored in buffer memory from which the segments can be retrieved and decompressed in data compressor for immediate or subsequent viewing.

Walters et al, U.S. Pat. No. 5,440,334, shows an apparatus and method for broadcast burst transmission of compressed audio/video programs from a stored library to a multiplicity of subscribers. The stored programs are burst transmitted repeatedly in a predetermined sequence of entire programs or segments thereof to a receiver at each subscriber's location. Each receiver is operative for accessing the predetermined broadcast schedule, inputting a subscriber's order for one or more programs, monitoring the broadcast burst transmissions for the one or more ordered programs, receiving the one or more ordered programs in a burst time period corresponding to the time period of the burst transmission, and storing the one or more ordered programs. The subscriber then enjoys full VCR-like control over playback at his convenience of the ordered, stored programs, that are then decompressed by the receiver for viewing in real time.

Hooper et al, U.S. Pat. No. 5,442,390, shows in a system for interactively viewing videos, a selected video is transmitted as a plurality of frames of digitized video data for playback on a viewing device. The system received the transmitted video data and includes a memory buffer for storing a segment of a selected one of the videos. The segment includes a predetermined number of frames representing a predetermined time interval of the selected video.

In addition, the memory buffer including a write pointer and a read pointer. Software controlled servers are provided for writing and reading video data of the selected video to and from the memory buffer, independently, at locations indicated by the write and read pointers to transfer the selected video to the viewing device. By using a remote controller the viewer can position the read and write pointers to view any portion of the selected video interactively.

Beriont, U.S. Pat. No. 5,479,202, shows a network interface module operably connected to a subscriber's television receiver and to a switched broadband digital network includes a fiber-compatible digital transceiver. A downlink receiver in the transceiver detects video/audio/data information that is time-multiplexed within a serially transmitted digital signal optically transmitted by the switched digital network as a broadband digital downlink channel. The detected information is decoded into a parallel format of video/data samples, audio samples, and recovered sample clock that are applied to a digital switch in the television receiver.

SUMMARY OF THE INVENTION

The present invention is a system for providing video presentations of available real estate properties and associated information on demand and includes a large inventory of pre-recorded video presentation files stored in associated local market locations. These local market locations are interconnected by a dedicated wide area data transfer and communications network. Local real estate information servers are interconnected as nodes in the network. The servers each provide an inventory of full-motion video files representing the available properties in its local market. The full-motion video information is recorded, stored, transferred, and displayed using high speed digital data handling techniques. The full-motion video information is accompanied by digitized audio sound tracks. In the preferred embodiment, the video programs are records of homes, businesses, or other property which is for sale. Each of the programs presents the property for sale in such a manner that a prospective buyer has the opportunity to preview the property, both exterior and interior, prior to deciding whether to visit the property or not. Such a full-motion video viewing provides the advantage, over still photographs, of enhancing the viewers understanding of the architectural features of the property with respect to human movement through and around the structure. This is important in that the charm of a building structure is strongly related to how the various spaces interact with one another. Thus it is an object of the invention to enable full-motion video display of properties available for sale in a local market. It is a further object of the invention to provide such a system as to enable a buyer anywhere within the geographic area served by the network to view any property within the geographic area served by the network with such presentation occurring on demand.

Further objectives include the minimizing of massive centralized data storage devices and the delays in data transfer durations which result when large scale data transfers are forced over communication channels having limited bandwidth.

Still further objectives include the improvements in security, availability and reliability of data transfer by employing information redundancy within the system.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawing illustrates the present invention, a systems network and method for providing full-motion video on demand over standard telephone wires. In such drawings.

DETAILED DESCRIPTION OF THE PREFERRED EMBODIMENT

Figure 1:
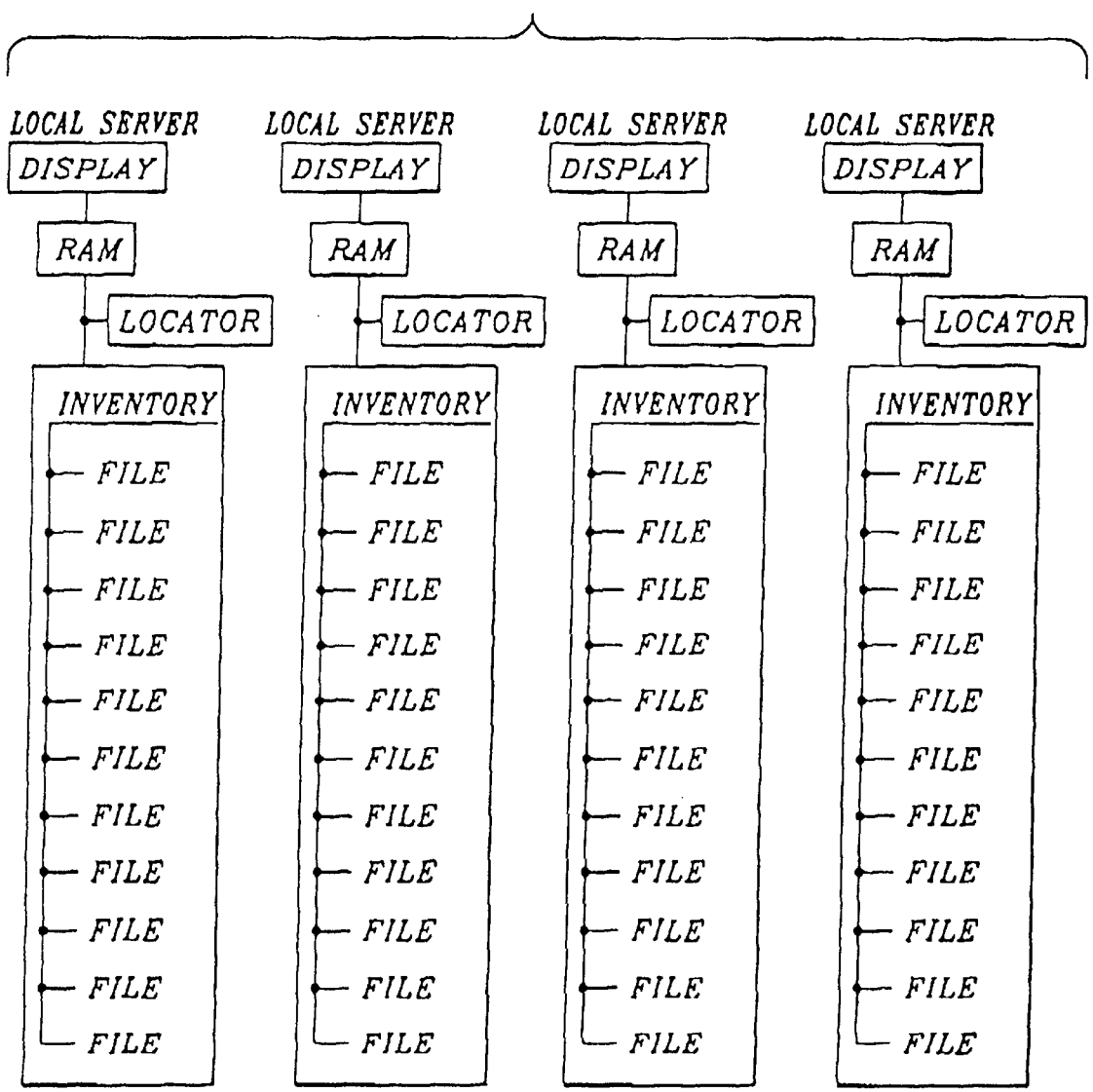
FIG. 1 is a block diagram of the a preferred embodiment showing a plurality of the local servers of the present invention.
Figure 2:
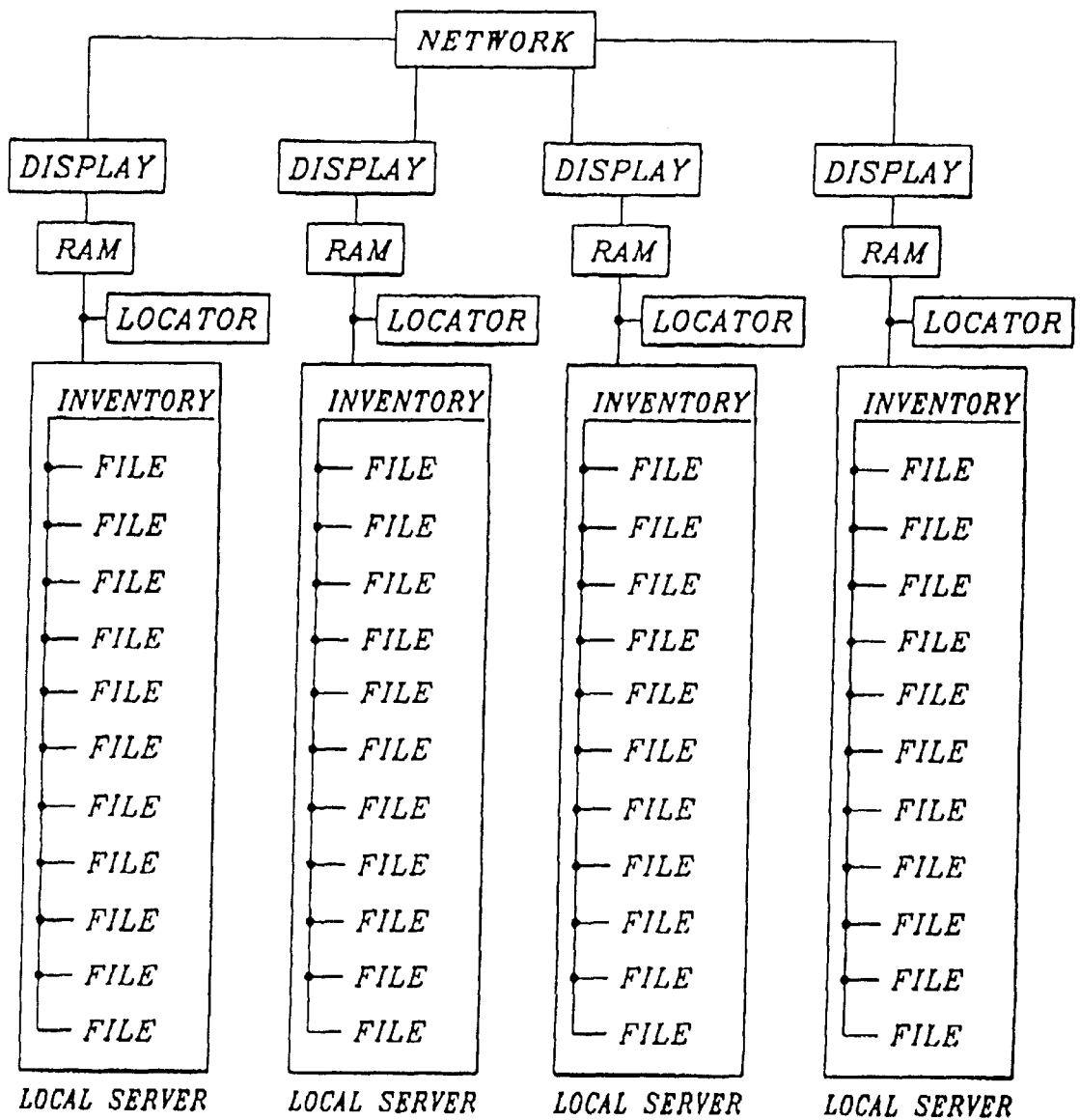
FIG. 2 is a diagram similar to that of FIG. 1 wherein the local servers are interconnected over a communications network.
Figure 3:
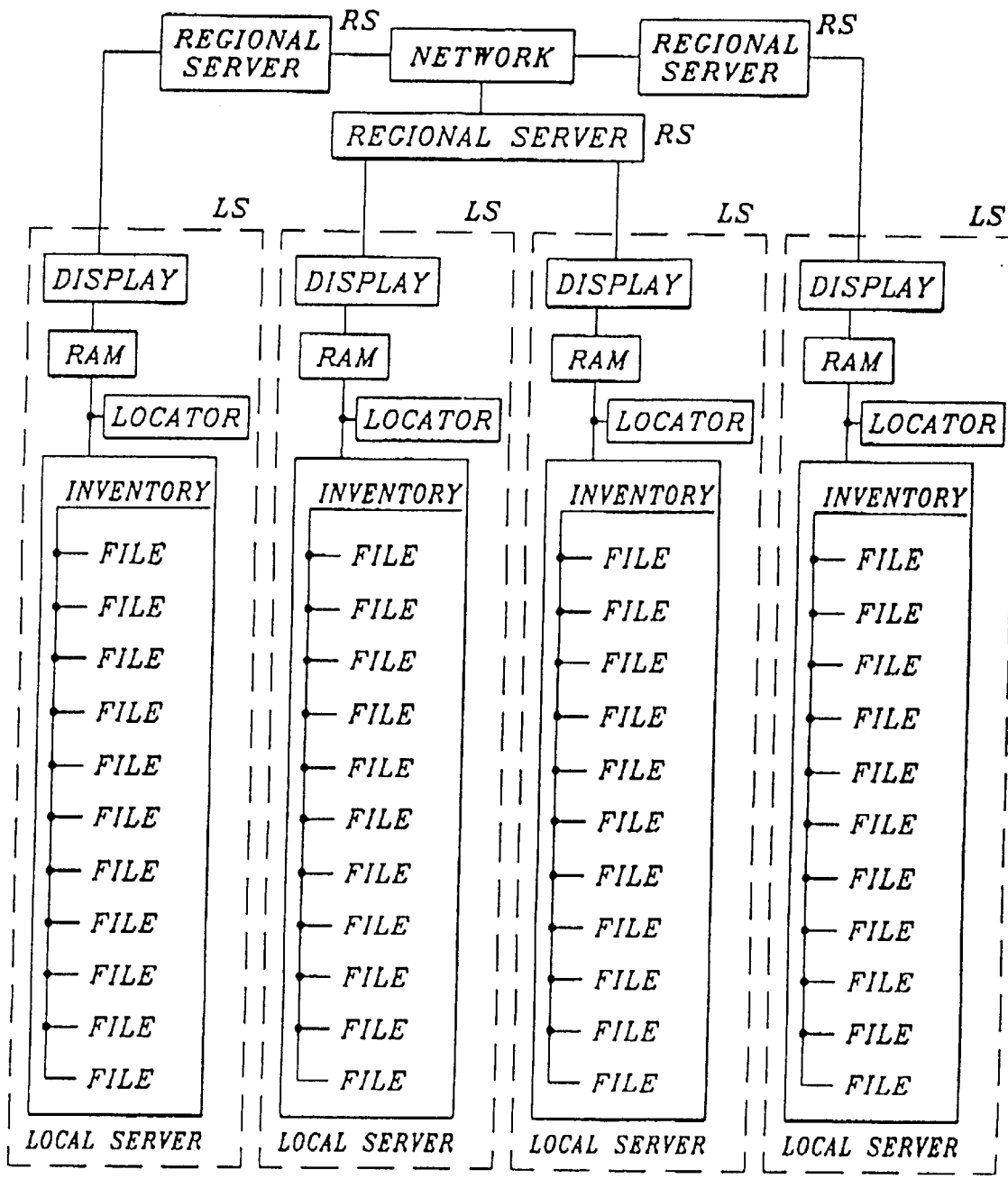
FIG. 3 is a diagram similar to that of FIG. 2 wherein the local servers are interconnected through regional servers in the network.

The invention is a system wherein conventional local real estate sales offices are able to provide information concerning for-sale properties to potential buyers. The system enables a buyer who is physically located anywhere within a large geographical area, such as the continental United States, to view properties for sale which are located anywhere else within the operating area. The information provided includes full-motion video and sound recordings of the key features of each of the properties as well as information about the region where the properties are located. The individual, original full-motion video programs, are preferably of a relatively short viewing length, i.e., between one and five minutes each, with an average of two minutes each. Such a two minute video program comprises approximately 20 megabytes (million bytes) of digital signal information, using current compression technology.

The system employs an information data base and data distribution network. Major network components include nodes identified here as Regional Real Estate Information Servers, abbreviated as "RS" and Local Real Estate Information Servers abbreviated as "LS", as well as a conventional wide area switching network with tie lines and switching stations placed appropriately for handling communications traffic, i.e., calls and data transfers, as required within the network. The RS and LS are represented by high-speed general purpose computer systems as will be described below. Each LS maintains property data files as an inventory residing in its random access storage device(s). As stated, each of these property files preferably corresponds to a single unique real estate property within an assigned local geographical area or market. In the preferred embodiment, the geographical areas are assigned by postal ZIP code. Each LS is assigned a designated RS, and each RS is designated for a plurality of LS. The function of each of the RS is to maintain a national locator file for identifying which geographical area is assigned to each LS within the system.

When a buyer wishes to view for-sale properties in a local market, property files are retrieved from the random access storage device of a local LS. Let us designate this LS as LS'. When a buyer wishes to view for-sale properties which are located outside of the local market or which are not presently available at LS', these files are retrieved from LS", where LS" may be any one, or more of the other LS in the system. In order to identify which LS" may have specific property files, or files generally, of the types and locations desired, LS' contacts RS', its designated regional server, and identifies its need. RS' responds to LS' by looking-up, in its national locator file, the one or more LS" which potentially have the files of interest. RS' downloads the addresses of the relevant LS" to LS'. LS' then uses these addresses to contact the relevant LS" directly until it finds an LS" that has the relevant files, and these files then are downloaded (copied) to LS' for its use locally.

The RS hardware configuration generally comprises a video monitor, high speed computer processor and its peripheral support circuits, an, at least, forty gigabyte magnetic storage device, preferably a fast access "hard Drive" storage medium, at least 128 megabytes of solid state random access memory, at least one 3½ inch floppy drive, an SVGA video driver card with at least two megabytes of memory, at least one high speed modem device, a CD-Rom device including reading and writing capability, input/output ports appropriate to the system, a digital sound reproduction circuit, an Ethernet network interface circuit, and input devices including a keyboard and a screen pointing device generally known as a "mouse". The LS hardware configuration generally comprises a similar list of components but with storage devices of lesser capacity. The network uses MPEG hardware and techniques so as to streamline video data transfer streams making it practical to share lengthy video files over long-line digital networks on demand.

All components of the network preferably utilize standard transmission control protocol/internet protocol (TCP/IP) technology for information transfer so that each node in the network is assigned a unique IP address. All network entities may communicate freely with all other network entities without the involvement of an intermediary, i.e., any IP is programmed to be able to dial-up any other IP directly using the network. The network employs all forms of standard data transfer links including hard wire, microwave, and satellite links as needed and as available for meeting the needs of the objectives of the inventions.

Integrated Services Digital Network (ISDN) lines are in accordance with an international communications standard for sending voice, video, and data over digital telephone lines. ISDN lines are used to achieve data rates of 128 bps, for or five times the data transfer rates achieved today over analog lines using fast modems. All interconnections between RS and LS in the network use ISDN data links.

The system is more specifically described as comprising a plurality of inventories of real estate property data files, each of the property files providing video motion picture, and audio information describing at least one real estate property. Such files may also include sales agent promotional information, sales office promotional information, real estate market local area information and descriptions, and possibly advertisements for real estate or real estate sales products or services. The system further includes a plurality of random access memory devices, each one of the memory devices storing at least one of the inventories, a plurality of local locator data files, each of the local locator files corresponding to at least one of the inventories, and providing identification of the property files therein, a means for identifying at least one of the property files as conforming to a property profile of interest to a buyer, a means for accessing the at least one of the property files in one of the local locator files on one of the random access memory devices and a means for displaying the at least one of the property files as a multi-media presentation to the buyer.

The identifying means comprises any of the well known and currently used data base management methods used to query the files in a data base. For instance, in the present invention, each of the property files includes fields identifying the number of bedrooms, number of bathrooms, and the price of the property, as examples of several typical fields. The identifying means is a program instruction set that enables the searching of these fields for matches between selections expressed by a buyer with the values in these fields. Such a program set is defmed in software packages such as Excel® by Microsoft Corporation. The Accessing means, again, is defined generally in programs such as Excel® wherein once a file match is made, a copy of the file is written to random access memory or virtual memory on a hard drive storage device so as to be available for viewing. The displaying means is preferably the video monitor and speaker system defined above.

The memory devices, inventories, local locator files, identifying means, accessing means and displaying means are preferably distributed over a plurality of local servers such that each server has access to that portion of the property files comprising a logical local real estate market.

The invention further includes a high speed dedicated data communication network interconnecting the local servers in a manner such that each local server may search for, access, and download any of the property files at each other local server. In order to identify the local servers whose inventory includes specific property files and potential files for specific property types and locations, a plurality of regional servers is preferably established. Each of these RS incorporates a national locator file containing such information.

The method of use of the present invention comprises the steps of: providing a plurality of inventories of real estate property data files, each of the property files providing video motion picture and audio, information describing at least one real estate property, storing each of the inventories on a random access memory device at one of a plurality of local information servers, storing a local locator data file corresponding to the one of the inventories at each one of the local servers, identifying at least one of the property files as conforming to a property profile of interest to a buyer, and displaying the at least one of the property files as a multi-media presentation to the buyer.

In the case where information must be obtained from a remote server, the method further includes the steps of: interconnecting the local servers with a high speed data communication network in a manner such that each of the local servers may communicate directly with each of the other local servers, searching the local locator file in at least one of the remote servers for at least one of the property data files, said searching being conducted over the communication network, and transferring the at least one of the property files from the remote server to the local server.

In order to establish a means for efficiently identifying remote servers potentially having property files of interest, the method advantageously includes the further steps of: establishing a regional server for each of at least tow of the local servers, interconnecting the local and regional servers with a high speed data communication network in a manner such that each one of the servers may communicate directly with each other of the servers, storing a national locator file at each one of the regional servers, searching the national locator file in at least one the regional servers for at least one of the property files, said searching being conducted over the communication network, and transferring the at least one of the property files from one of the local servers to the another of the local servers for use therein.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A system for providing distributive access, by local real estate information servers, to real estate information, the system comprising:
   a plurality of inventories of real estate property data files, each of the property files providing video motion picture, and audio information describing at least one real estate property;
   a plurality of random access memory devices, each one of the memory devices storing at least one of the inventories;
   a plurality of local locator data files, each of the locator files corresponding to at least one of the inventories, and providing identification of the property files therein;
   means for identifying at least one of the property files as conforming to a property profile of interest to a buyer;
   means for accessing the at least one of the property files in one of the local locator files on one of the random access memory devices;
   means for displaying the at least one of the property files as a multi-media presentation to the buyer.

2. The system of claim 1 wherein the memory devices, inventories, local locator files, identifying means, accessing means and displaying means are distributed over the local servers such that each office has access to that portion of the property files comprising a logical local real estate market.

3. The system of claim 2 further including a high speed dedicated data communication network interconnecting the local offices in a manner such that each local server may search for, access, and download any of the property files at each other local server.

4. A system for providing distributive access, by local and regional real estate information servers, to real estate information, the system comprising:
   a plurality of inventories of real estate property data files, each of the property files providing video motion picture, and audio information describing at least one real estate property;
   a plurality of random access memory devices, each one of the memory devices storing at least one of the inventories;
   a plurality of local locator data files, each of the local locator files corresponding to at least one of the inventories, and providing identification of the property files therein;
   means for identifying at least one of the property files as conforming to a property profile of interest to a buyer;
   means for accessing the at least one of the property files in one of the local locator files on one of the random access memory devices;
   means for displaying the at least one of the property files as a multi-media presentation to the buyer.

5. The system of claim 4 wherein the memory devices, inventories, local locator files, identifying means, accessing means and displaying means are distributed over the information servers such that each said local server has access to that portion of the property files comprising a logical local real estate market and each regional server provides a national locator file for locating all property files in a logical regional real estate market.

6. The system of claim 5 further including a high speed dedicated data communication network interconnecting the offices in a manner such that each server may search for, access, and download any of the property files at each other server.

7. A method of providing distributive access to real estate information, the method comprising the steps of:
   a) providing a plurality of inventories of real estate property data files, each of the property files providing video motion picture, and audio, information describing at least one real estate property;
   b) storing each of the inventories on a random access memory device at one of a plurality of local real estate information servers;
   c) storing a locator data file corresponding to the one of the inventories at each one of the local servers;
   d) identifying at least one of the property files as conforming to a property profile of interest to a buyer;
   e) displaying the at least one of the property files as a multi-media presentation to the buyer.

8. The method of claim 7 further including the steps, taken after step (d), of:
   f) interconnecting the local servers with a high speed data communication network in a manner such that each of the local offices may communicate directly with each of the other local servers;
   g) searching the locator file in at least one of the local offices for at least one of the property data files, said searching being conducted over the communication network from another of the local servers.
   h) transferring the at least one of the property files from one of the local servers to the another of the local servers for use therein.

9. The method of claim 7 further including the steps:
   j) establishing, a regional real estate sales information server for each of at least two of the local real estate information servers;
   k) interconnecting the local and regional real estate information servers with a high speed data communication network in a manner such that each one of the servers may communicate directly with each other of the servers;
   l) storing a national locator data file at each one of the regional information servers, each of the national locator files corresponding to the inventories of the at least two of the local servers;
   m) searching the national locator file in at least one of the regional servers for at least one of the property files, said searching being conducted over the communication network from another of the local servers;
   n) transferring the at least one of the property files from one of the information servers to the another of the local servers for use therein.

* * * * *